United States Patent [19]

Schmitt et al.

[11] Patent Number: 5,433,064
[45] Date of Patent: Jul. 18, 1995

[54] ROTARY CUTTER BED HARVESTER WITH NON-AUGER CONVEYING MEANS FOR OUTBOARD CUTTERS

[75] Inventors: Raymond F. Schmitt, Hesston; Cecil L. Case, Newton; Martin E. Pruitt; Michael L. O'Halloran, both of Hesston, all of Kans.

[73] Assignee: Hay & Forage Industries, Hesston, Kans.

[21] Appl. No.: 234,225

[22] Filed: Apr. 28, 1994

[51] Int. Cl.⁶ .................. A01D 34/66; A01D 34/82
[52] U.S. Cl. ........................... 56/6; 56/13.9; 56/DIG. 6; 56/DIG. 11
[58] Field of Search ............ 56/6, 13.5, 13.9, 15.1, 56/15.2, 15.5, 15.6, 16.4 R, 255, 295, 192, DIG. 1, DIG. 6, DIG. 9, DIG. 11

[56] References Cited

U.S. PATENT DOCUMENTS

| | | | |
|---|---|---|---|
| 4,166,350 | 9/1979 | Werner | 56/320.1 |
| 4,283,905 | 8/1981 | van der Lely | 56/6 X |
| 4,330,982 | 5/1982 | Vissers et al. | 56/192 |
| 4,487,003 | 12/1984 | Mathews et al. | 56/13.6 |
| 4,531,349 | 7/1985 | Ehrhart et al. | 56/13.6 |
| 4,567,716 | 2/1986 | Makofka et al. | 56/13.6 |
| 4,693,062 | 9/1987 | van der Lely et al. | 56/13.6 |
| 4,879,870 | 11/1989 | Neuerburg | 56/6 X |
| 4,899,523 | 2/1990 | Frumholtz et al. | 56/155 |
| 4,909,023 | 3/1990 | Haberkorn et al. | 56/13.6 |
| 5,172,539 | 12/1992 | Jennings et al. | 56/6 |
| 5,179,822 | 1/1993 | McLean | 56/6 |
| 5,272,859 | 12/1993 | Pruitt et al. | 56/15.2 |

Primary Examiner—Terry Lee Melius
Attorney, Agent, or Firm—Hovey, Williams, Timmons & Collins

[57] ABSTRACT

A crop harvester of the rotary cutter bed type has a series of rotary cutters extending across the path of travel of the machine and rotatable about individual upright axes. The cutter bed extends in opposite directions beyond the ends of a central discharge opening to the conditioner rolls. Cutters located outboard of the opening direct cut crop materials along the front of the cutter bed until the opposite extremities of the discharge openings are reached, whereupon pairs of cooperating, oppositely rotating cutters in front of the opening function to propel the crop material rearwardly with the main flow of cut materials. Alternative forms of conveying means are provided in association with the outboard cutters for moving the cut crop centrally without the use of augers or other additional gathering mechanism behind the row of cutters.

6 Claims, 10 Drawing Sheets

ROTARY CUTTER BED HARVESTER WITH NON-AUGER CONVEYING MEANS FOR OUTBOARD CUTTERS

CROSS-REFERENCE TO RELATED APPLICATIONS

This application is related to co-pending application Ser. No. 08/234,232 presently accorded a filing date of Apr. 28, 1994 titled Wide Cut Harvester Having Rotary Cutter Bed in the names of Michael L. O'Halloran, et al. and to co-pending application Ser. No. 08/237,033 filed May 3, 1994 titled Harvester with Hydraulically Driven, Flow-Compensated Rotary Cutter Bed in the names of Michael L. O'Halloran, et al.

TECHNICAL FIELD

The present invention relates to the field of crop harvesters and, more particularly, to harvesters of the type which utilize a cutter bed having a series of relatively high speed, rotary cutters that sever the standing crop from the ground as the machine advances through the field.

BACKGROUND

One example of a harvester with rotary cutters is disclosed in U.S. Pat. No. 5,272,859 titled MECHANICAL DRIVE CENTER PIVOT MOWER CONDITIONER, which patent is owned by the assignee of the present invention. The harvesting machine disclosed in the '859 Patent is a pull-type harvester which requires the use of a separate tractor for towing the harvester through the field during use. The operating components of that harvester are mechanically driven through a drive line that is coupled with the power takeoff shaft of the towing tractor.

The harvester disclosed in the '859 Patent is also a conditioner, which means that the severed crop materials are passed between a pair of superimposed conditioning rolls before being discharged onto the ground. However, as a practical matter there is a limit to the length which such rolls can have and still function in an optimal manner. Thus, while the width of cut taken by a mower-conditioner using roll type conditioning mechanism can be made significantly wider than the length of the conditioning rolls, the crop that is severed by the machine must somehow be gathered inwardly after severance before being directed through the shorter conditioning rolls. Augers and other consolidating devices can be used behind the cutter bed for this purpose, but this adds an additional expense and subjects the crop materials to extra mechanical handling, which may be undesirable in many cases. The wider the cut, the more difficult the problem of conveying the severed outboard materials toward the center without using some kind of extra conveyor apparatus behind the cutters.

Furthermore, in making a longer cutter bed than disclosed in the '859 Patent wherein the endmost cutters are located at the opposite edges of a discharge opening to the conditioner rolls, additional engineering and expense is involved if the extra, added-on cutters are to be driven with their own extra spur gears within the gear case beneath the cutters. Thus, it would be of considerable benefit if additional cutters could be added onto the cutter bed without the need for adding additional internal gearing to the existing gear case. In that way, a standard, uniform size gear case could be used for both the standard length cutter bed and the extended length cutter bed having additional cutters.

Commercial hay producers typically use self-propelled machines and usually prefer a wider cutting width than that found on many pull-type units. Along with the extra width, however, comes increased loading on the power distribution drive in the gear case. Moreover, if a standard length gear case is to be utilized, some means must again be provided for extending driving power to additional cutters that are added on to extend the effective length of the cutter bed. Since in many instances the self-propelled tractors available for use with harvesters of this type are conventionally provided with engines capable of supplying pressurized hydraulic fluid for the operating components of a harvesting header, and since hydraulically powered machines are preferred in many instances by commercial operators, it would be desirable and beneficial to provide a hydraulic-driven cutter bed that would meet the needs and desires of commercial operators.

SUMMARY OF THE PRESENT INVENTION

Accordingly, one important object of the present invention is to provide a way of making a longer cutter bed out of a certain length gear case so that additional cutters can be added to opposite ends of the gear case without necessitating redesign of the internal gear train of the gear case. Stated otherwise, an important object of this invention is to provide a way of using the cutter bed gear case of a shorter width machine, such as a twelve foot cutting width, on a wider cut machine, such as a fifteen foot machine, without designing a whole new gear case, complete with additional gears, bearings and other components appropriate for the wider effective cutting width.

Another important object of the present invention is to provide a rotary style machine in which the cut width can be substantially wider than the opening to the conditioner mechanism without requiring the addition of center gathering augers or other consolidating mechanism behind the cutter bed to consolidate the wide volume of cut material before it is presented to the conditioning mechanism.

A further important object of the invention is to provide a hydraulically powered, wide cut rotary style harvester that is particularly well-suited for commercial hay operations in which self-propelled tractors are typically favored and achieving high levels of productivity through harvesting speed and maximum cut width is a high priority. In this connection, one important object is to provide a hydraulic drive arrangement which dramatically increases cutter bed life through decreased loading on the individual gears, bearings and other components of the cutter bed, without sacrificing cutting power, blade speed or ground speed of the harvester.

Additionally, an important object of the invention is to provide a hydraulic drive for the rotary style cutter bed of a harvester in which the cutter bed speed remains substantially constant even if the engine speed of the mechanism driving a hydraulic pump for the bed lugs down such as when heavy crop conditions are encountered.

In carrying out the foregoing and other important objects, the present invention contemplates, in one preferred embodiment, increasing the effective length of a standard-length cutter bed by adding a pair of extensions or supports to opposite ends of the original gear case. Additional rotary cutters are journalled by the extended supports for rotation about upright axes. Instead of increasing the length of the gear train through the gear case, driving power to the added cutters is supplied by overhead drive mechanism that connects upright shafts of the added cutters with upright shafts associated with the opposite end cutters of the original gear case. Such over-the-top mechanism may take the form, for example, of timing belts and pulleys, chain and sprockets, gear boxes and universal joint couplings, or a spur gear train. In the event that the cutter bed is mechanically driven, one of the shafts associated with the original gear case serves as the driving input shaft from which all of the gears in the gear case receive their driving power. On the other hand, if the drive is a hydraulic drive, the present invention contemplates coupling at least one hydraulic motor with the cutter bed. Preferably, a separate hydraulic motor is coupled with each shaft of the two end gears in the gear case and such motors are connected in a parallel fluid flow relationship so that the work of driving the gears in the gear case and their respective cutters, as well as the added-on-cutters, is shared uniformly by both of the hydraulic motors. Such load sharing comes by virtue of the uninterrupted mechanical drive train through the gears in the cutter bed and the parallel fluid connection between the motors. As a result, the loading on individual gears, bearings and other components is dramatically reduced from what it would otherwise be.

The hydraulic motors are mounted on the header frame above a horizontal partition or wall that separates the overhead motors from the cutting and consolidating region below the partition. A special flow volume compensating circuit in the hydraulic drive system responds to engine slow-down caused by increased loading in the hydraulic operating circuit so as to allow essentially the same flow volume rate of oil to move to the motors notwithstanding the change in engine speed that would normally cause reduced volume. The cutter speed thus remains substantially unchanged.

Alternative consolidating or conveying means associated with the cutters laterally outside of the discharge opening of the header are provided to achieve inward consolidation of cut crop from the outer cutters. Such conveying means may take alternative forms such as an upright platform or conveyor belt, a rotary, suspended drum between each pair of outer cutters, or a suspended rotary cage-type impeller between impeller cages of the outer cutters.

DETAILED DESCRIPTION

Extended Cutter Bed Construction

Figure 1:
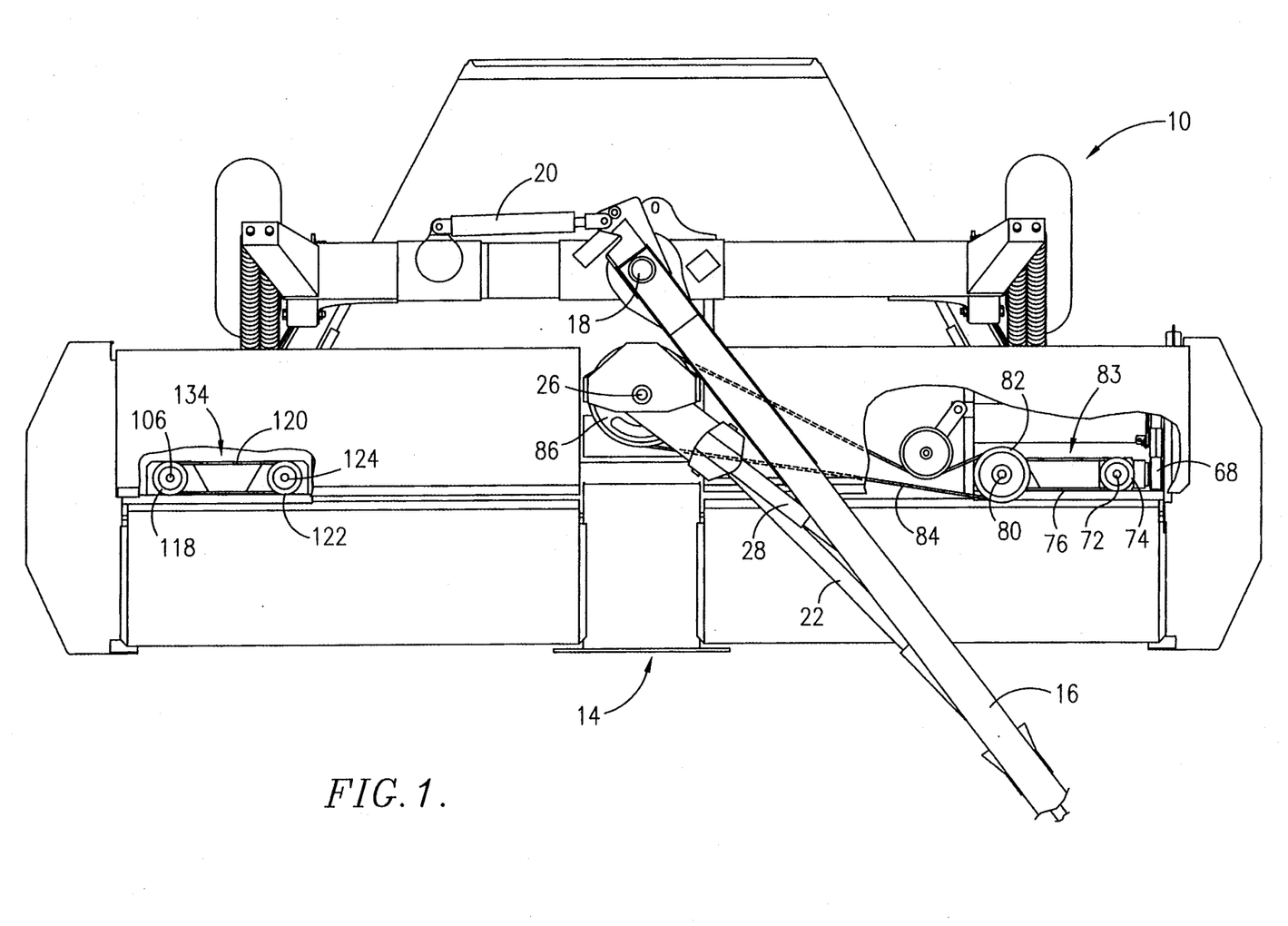
FIG. 1 is a top plan view of a pull type harvester having a rotary cutter bed constructed in accordance with the principles of the present invention.

The harvester 10 in FIG. 1 is a pull type harvester having a wheeled frame 12 that supports a forwardly disposed harvesting header 14. A center pivot tongue 16 is attached at its rear end to the frame 12 via an upright pivot 18 and is adapted to be hitched at its forward end (not shown) to a towing tractor (also not shown). A hydraulic cylinder 20 interconnecting the rear of the tongue 16 and the frame 12 is adapted to be operated from the tractor seat so as to adjust the angular position of the tongue 16 relative to the frame 12 on-the-go, causing the harvester 10 to be adjustably shifted laterally in its trailing relationship with the tractor. A mechanical drive line 22 beneath the tongue 16 connects at its forward end to the power takeoff shaft (not shown) of the towing tractor, while the rear end of the drive line 22 connects to a gearbox 24 (FIG. 3) supported on the header 14 forwardly of the tongue pivot 18. The gearbox 24 can swivel about an upright axis defined by the journal 26 and is steered in such swiveling movement by a link 28 connected to the underside of the tongue 16 and the gearbox 24. Such features are fully disclosed in the above mentioned U.S. Pat. No. 5,272,859 which is hereby incorporated by reference into the present specification as need be for a full and complete understanding of the present invention.

Figure 2:
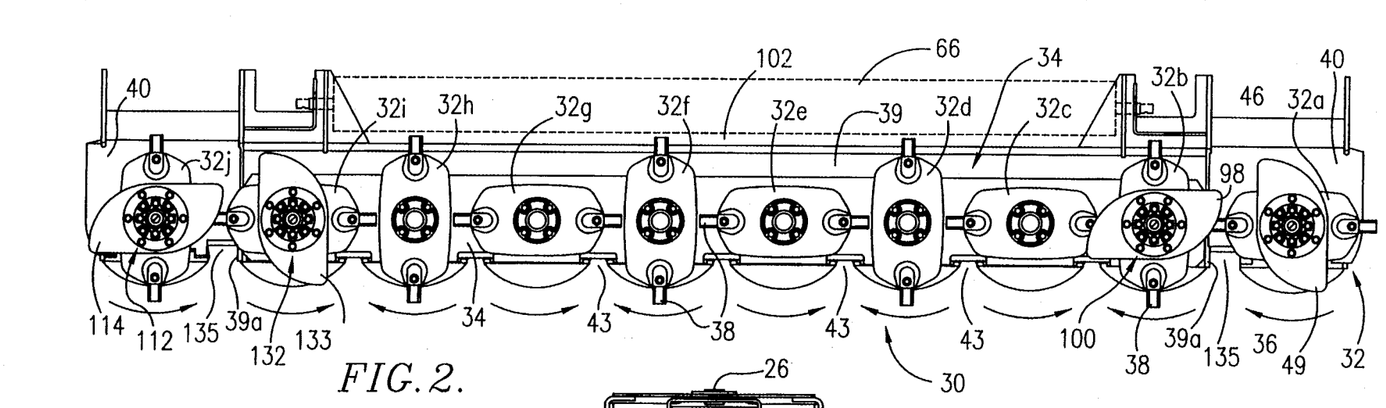
FIG. 2 is a top plan view of the cutter bed itself illustrating the rotary cutters.
Figure 3:
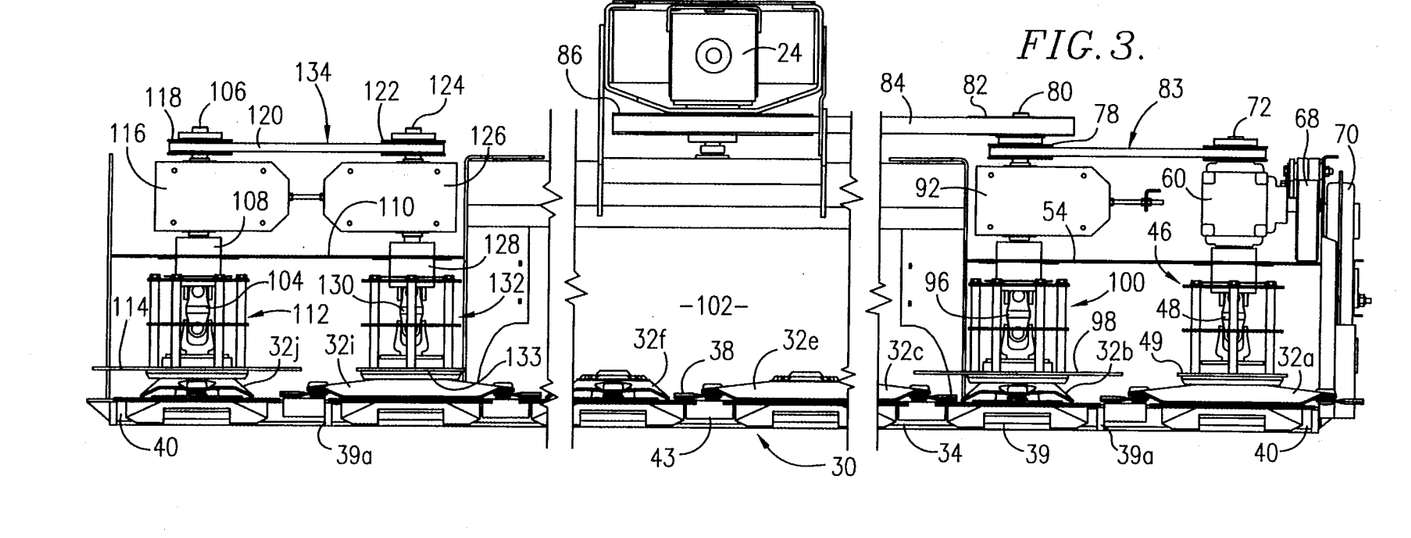
FIG. 3 is an enlarged, fragmentary, front elevational view of the header portion of the machine.
Figure 4:
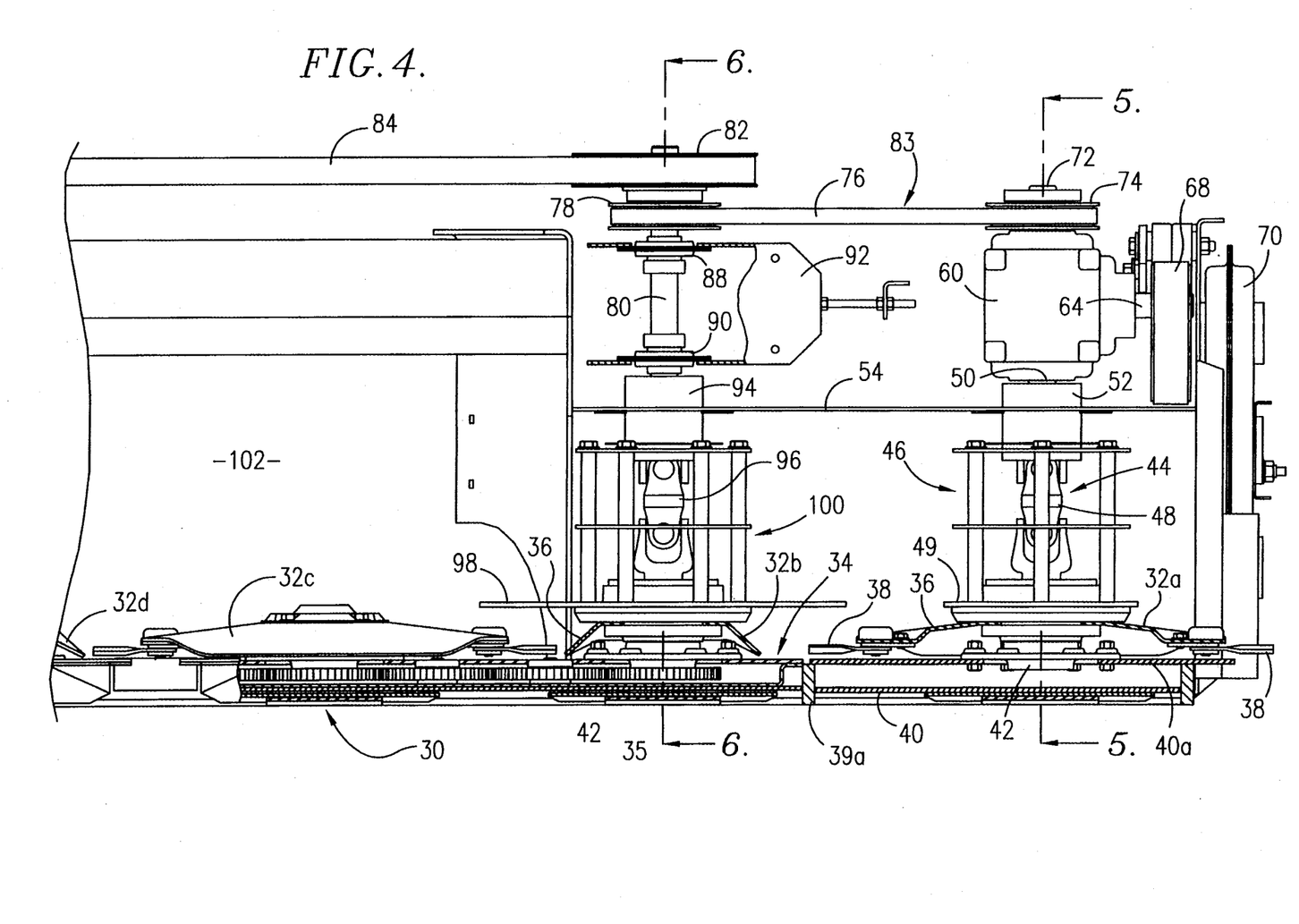
FIG. 4 is a further enlarged, fragmentary front elevational view of the left end of the cutter bed (as viewed from the rear of the machine) showing details of construction with parts broken away and illustrated in cross section for clarity.

The header 14 includes a cutter bed 30 as illustrated in FIGS. 2, 3 and 4. The cutter bed 30 serves as a means by which standing crop is severed from the ground as the machine 10 is advanced. In the particular embodiment illustrated, the cutter bed 30 includes a series of ten rotary cutters 32 extending across the path of travel of the machine and each rotatable about its own upright axis. For the sake of convenience, the ten cutters 32 in FIG. 2 will be denoted by the letters 32a–32j, beginning with the left most cutter 32 in the series as viewed from the rear of the machine. The group of intermediate cutters 32b–32i are rotatably supported on an elongated, flat gear case 34 that extends underneath the cutters 32b–32i for the full length of the group. The gear case 34 is hollow as shown in FIG. 4 and contains a train of flat spur gears 35 that are operably engaged with one another and thus serve to distribute driving power between one another. Although other forms of power distribution means can be utilized within the case 34, such as shafts and bevel gears or belts and pulleys, the flat spur gears 35 are preferred. Each of the cutters 32 includes a generally elliptical, formed metal knife carrier 36, such as illustrated by the cutter 32a, and a pair of free swinging knives 38 at opposite ends of the carrier 36 as well understood by those skilled in the art. As noted in FIG. 2, all of the cutters 32a–32j are ninety degrees out of phase with one another inasmuch as the circular paths of travel of the knives of adjacent cutters overlap one another and must be appropriately out of phase in order to avoid striking each other. Due to the positive mechanical drive connection between the group of intermediate cutters 32b–32i through the spur gears 35, such cutters always remain properly in phase with one another, the outer cutters 32a and 32j remaining in proper phase by means yet-to-be-described.

Figure 6:
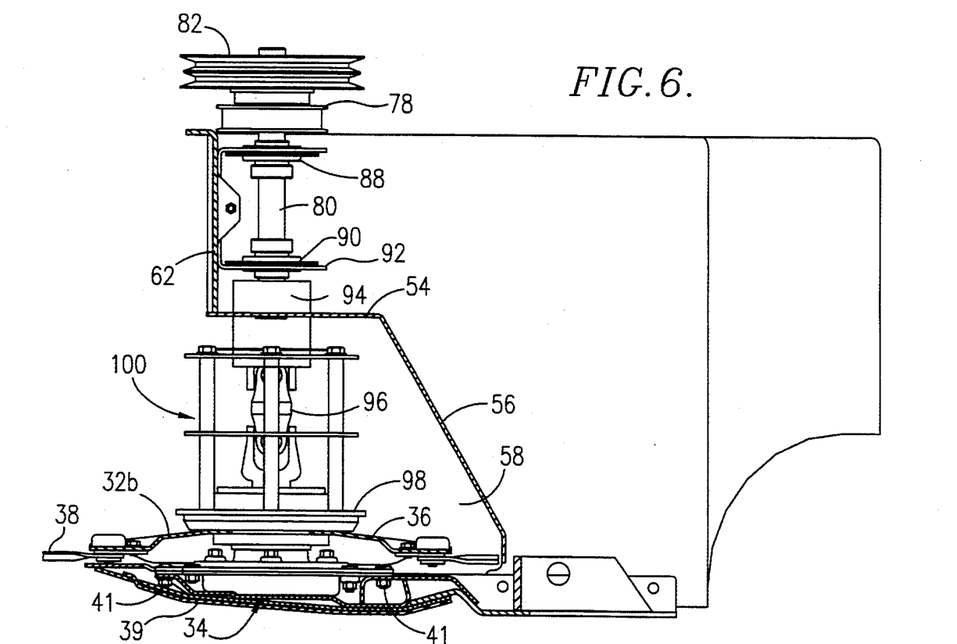
FIG. 6 is a similar vertical cross sectional view through the next inboard cutter taken substantially along line 6—6 of FIG. 4.

As shown in FIGS. 2 and 6, the gear case 34 is carried by a shelf-like cradle 39 that juts forwardly from the lower, front edge of the header 14 and extends along the length thereof. The upper face of the cradle 39 is provided with a long recess or socket across the front of the machine that matingly receives the gear case 34. As shown in FIG. 6, an overhanging peripheral flange on the gear case 34 receives a series of bolt assemblies 41 which secure the gear case 34 to the cradle 39. Front notches 43 in the leading edge of the cradle 39 (FIG. 2) are positioned between the counterrotating cutters 32b–32i to improve the severing action against those portions of standing crop materials aligned with the zones generally between adjacent cutters instead of directly in front of them.

As illustrated particularly in FIGS. 2-6, the cradle 39 has a pair of forwardly projecting support bars 39a at its opposite ends. Each of the support bars 39a, in turn, has a hollow support extensions 40 welded thereto and projecting laterally outwardly therefrom for rotatably supporting the two outer cutters 32a and 32j. Although the extensions 40 are hollow, they contain no spur gears or other power distribution mechanism. Instead, as illustrated by the cutter 32a in FIGS. 4 and 5, each of the outer cutters 32a, 32j merely has a bearing assembly 42 secured to the top wall 40a of extension support 40 for rotatably supporting an upright shaft assembly 44 that projects upwardly from the cutter 32a or 32j and defines the axis of rotation thereof. In both of the outer cutters 32a and 32j, the carriers 36 are secured to the corresponding shaft assembly 44 for rotation therewith.

Figure 5:
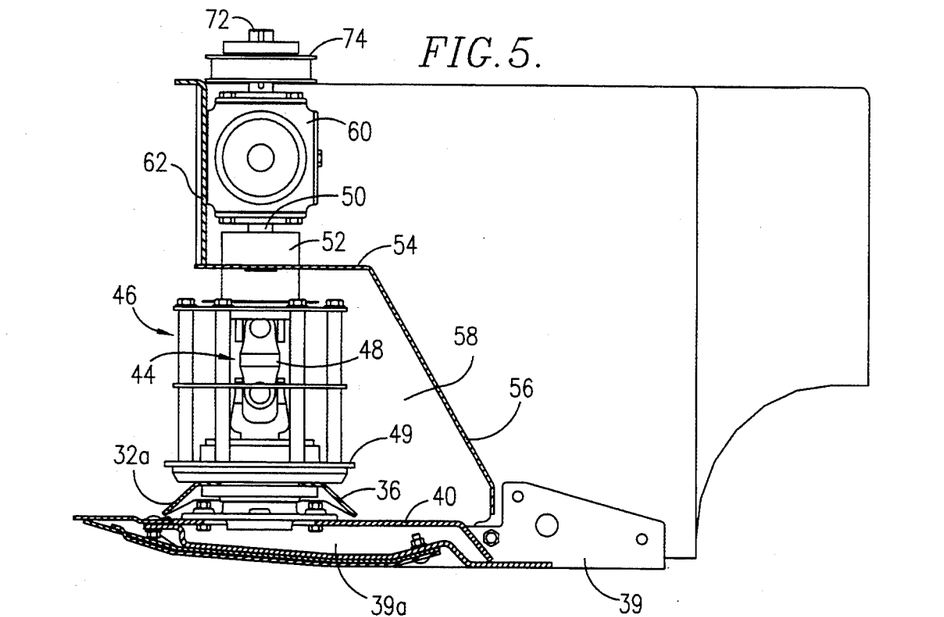
FIG. 5 is a vertical cross sectional view through the outer cutter and its associated mechanism at the left end of the header taken substantially along line 5—5 of FIG. 4.

The shaft assembly 44 of the outer cutter 32a is centered within an impeller cage 46 of the same construction as the impeller cages in the incorporated '859 patent. Additionally, the shaft assembly 44 includes a lower universal joint 48 housed within the impeller cage 46 in the same manner as the '859 Patent. The cutter 32a also carries a kidney-shaped impeller plate 49 as in the '859 Patent. The universal joint 48 is connected at its upper end to a shaft 50 that passes through a surrounding sleeve 52 held in a fixed, vertical orientation by a horizontal partition or wall 54 extending above the cutters 32a and 32b. As shown in FIGS. 5 and 6, the overhead wall 54 merges at its rear extremity with a downwardly and rearwardly sloping back wall 56 to define a region 58 forwardly of the back wall 56 and below the overhead wall 54 within which the cutters 32a, 32b and 32i, 32j are located. The sleeve 52 projects down beyond the overhead wall 54 a sufficient distance as to extend into the top of the impeller cage 46 without providing support for the shaft assembly 44, and, at the other extreme, projects a short distance upwardly above the overhead wall 54.

The shaft 50 projects into a right angle gearbox 60 carried by an upright front wall 62 (FIG. 5) of the header. Inside the gearbox 60, the shaft 50 operably connects with a horizontal output shaft 64 that ultimately drives a pair of conditioning rolls 66 (FIG. 2) via a belt and pulley drive 68 and a transmission box 70.

The shafts 50 and 64 are operably coupled interiorly of the gearbox 60 with a vertical shaft 72 projecting from the top of the gearbox 60. Shaft 72 carries a sheave 74 which is entrained by an endless, flexible drive belt 76 extending horizontally inboard of the header where it entrains another sheave 78. The drive belt 76 is a timing belt of the type provided with a multitude of transverse, evenly spaced ribs along its working surface for meshing engagement with mating, upright groves in the working peripheries of the sheaves 74 and 78. This eliminates slippage between the timing belt 76 and the sheaves 74, 78 during operation, which maintains proper out-of-phase relationship between the outer cutter 32a and the next adjacent cutter 32b. The sheave 78 is fixed to an upright shaft 80 which receives driving input power from a large sheave 82 entrained by a flat drive belt 84 leading toward the center of the header. The opposite, lower end of the shaft 80 is coupled with the cutter 32b for driving the same. Thus, it will be seen that the universal coupling 48 of the cutter 38a, the shaft 50, the gearbox 60 and the shaft 72 broadly comprise driven shaft means for the cutter 32a, while the sheave 74, the timing belt 76 and the sheave 78 broadly comprise mechanism 83 operably coupling the driven shaft means with the drive shaft 80 for the second cutter 32b.

The belt 84 extends back to the center of the machine and at that location entrains a large sheave 86 that receives driving power from a downwardly projecting output shaft (not clearly shown in the drawings) of the gearbox 24.

The drive shaft 80 of the cutter 32b is journalled by a pair of upper and lower bearing assemblies 88 and 90 which are in turn supported within a generally C-shaped bracket 92 (FIGS. 4 and 6) fastened to the front wall 62 inboard of the attachment point for the gearbox 60 of cutter 32a. Shaft 80 projects downwardly from the bearing 90 through a sleeve 94, similar to the sleeve 52, which is fixed to the horizontal wall 54 and projects downwardly beyond the same. At a point near the lower end of the sleeve 94 the shaft 80 connects with a universal coupling 96 that is in turn fixed to a short upright shaft (not shown) having the spur gear 35 fixed thereto at its lower end. The short upright shaft of the cutter 32b is contained within the bearing assembly 42 thereof and such shaft is operably connected to the carrier 36 of the cutter 32b. A generally kidney shaped impeller plate 98 of the type disclosed in the '859 Patent is secured to the carrier 36 of the cutter 32b for rotation therewith. Additionally, an impeller cage 100 of the same construction as the cage 46 of cutter 32a is disposed above the impeller plate 98 encircling the universal coupling 96.

As illustrated in the figures, the cutter 32b and its drive shaft means comprising the upper shaft 80, the universal coupling 96 and the lower stub shaft within the bearing 42 are located adjacently outboard of a crop discharge opening 102 in the back wall 56 of the header 14. As shown in FIG. 2, the conditioning rolls 66 are located immediately behind the opening 102, which in turn is positioned directly behind the cutters 32c–32h. Like the cutter 32b, the cutter 32i is located adjacent one end of the opening 102, and preferably has its upright axis of rotation disposed slightly outboard of such opening.

As earlier mentioned, the group of intermediate cutters 32b–32i are drivingly interconnected and distribute power to one another through the train of spur gears 35 contained within the gear case 34 of the cutter bed 32. There is an unbroken chain of power distribution through the gear case 34 from the cutter 32b through and including the cutter 32i. On the other hand, like the cutter 32a, the cutter 32j is not driven by a spur gear directly beneath it. Instead, the hollow extension support 40 for the cutter 32j is empty like the support 40 for the cutter 32a.

The cutter 32j is driven in a similar manner to the cutter 32a through an over-the-top mechanism. Like the cutter 32a, the cutter 32j includes a universal coupling 104, a shaft 106 leading upwardly from the coupling 104, and a sleeve 108 encircling the shaft 106 at the point where shaft 106 is connected to the universal coupling 104. The sleeve 108 is supported within a top wall 110 which corresponds to the top wall 54 at the opposite end of the header. An impeller cage 112 encircles the universal coupling 104 and has an impeller plate 114. Instead of passing into a gearbox such as the gearbox 60 associated with cutter 32a, the upright shaft 106 of cutter 32j is supported by bearings and a C-shaped bracket 116 like the bearings 88, 90 and bracket 92 associated with the cutter 32b. Thus, the coupling 104 and the shaft 106 constitute driven shaft means for the cutter 32j.

The upper end of the shaft 106 is provided with a ribbed timing sheave 118 which is entrained by an endless timing belt 120. At its opposite end, the timing belt 120 is entrained around a second timing sheave 122 fixed to the upper end of a shaft 124 associated with the cutter 32i. The shaft 124 is supported by a C-shaped bracket 126 that is secured to a front wall corresponding to the front wall 62 on the left end of the header. Shaft 124 passes downwardly through a sleeve 128 supported by top wall 110. A universal coupling 130 joins with the shaft 124 within the sleeve 128 and connects at its bottom end with a short, upright stub shaft (not shown) beneath the carrier 36 of the cutter 32i, which is in turn secured to an aligned one of the spur gears 35 within the gear case 34. An impeller cage 132 surrounds the universal coupling 130 and is secured to the carrier 36 of cutter 32i. As can be seen, the sheave 118, the belt 120 and the sheave 122 effectively comprise mechanism denoted by the numeral 134 operably coupling the shaft 124 of the cutter 32i with the shaft 106 of the cutter 32j externally of the support 40 for driving the cutter 32j. An impeller plate 133 overlies and is secured to the carrier 36 of cutter 32i and is ninety degrees out of phase with the impeller plate 114 of the cutter 32j.

As illustrated in FIG. 2, the cutters 32b–32i in the intermediate group are arranged in cooperating pairs so that the two cutters of each pair rotate in opposite directions. In other words, the cutters 32b and 32c rotate toward one another across the front of the cutter bed as do the cutters 32d, 32e, the cutters 32f and 32g, and the cutters 32h and 32i. Consequently, the converging leading edges of the counter rotating cutters tend to direct the severed crop material rearwardly between such cutters at their point of convergence.

On the other hand, it will be noted that the two outermost cutters 32a and 32j rotate in the same direction across the front of the cutter bed as their next inboard cutters 32b and 32i. Accordingly, crop materials severed by the outermost cutters 32a and 32j are moved inwardly along the front of the cutters 32a, 32b and 32j, 32i until reaching the next converging nip point of the cutters in front of the discharge opening 102.

It is to be noted that because the outermost cutters 32a and 32j rotate inwardly in the same direction as their next adjacent cutters 32b and 32i, the cutters of those particular pairs must be spaced somewhat further from one another than the cutters of the oppositely rotating pairs in order to avoid striking one another. This is observable in FIG. 2, for example. Consequently, unless appropriate compensatory measures are taken, there is likely to be a slight decrease in the cutting quality in the zones directly between cutters 32a, 32b and 32i, 32j. Accordingly, it will be noted that the notches 135 between cutters 32a, 32b and 32i, 32j are somewhat deeper and wider than the notches 43 along the front edge of the cradle 39. This allows the standing crop material aligned with notches 135 to enter more deeply into the profile of the cutter bed 30 before the bed passes over the material, thus providing a greater opportunity for the arcuately moving cutter blade 38 to engage and sever the material before it is passed over by the bed 30. While the spur gears 35 within the gear case 34 preclude the notches 43 from being deeper than illustrated in FIG. 2, no such restriction exists with the support extensions 40 due to the fact they are hollow and devoid of mechanism.

Figure 7:
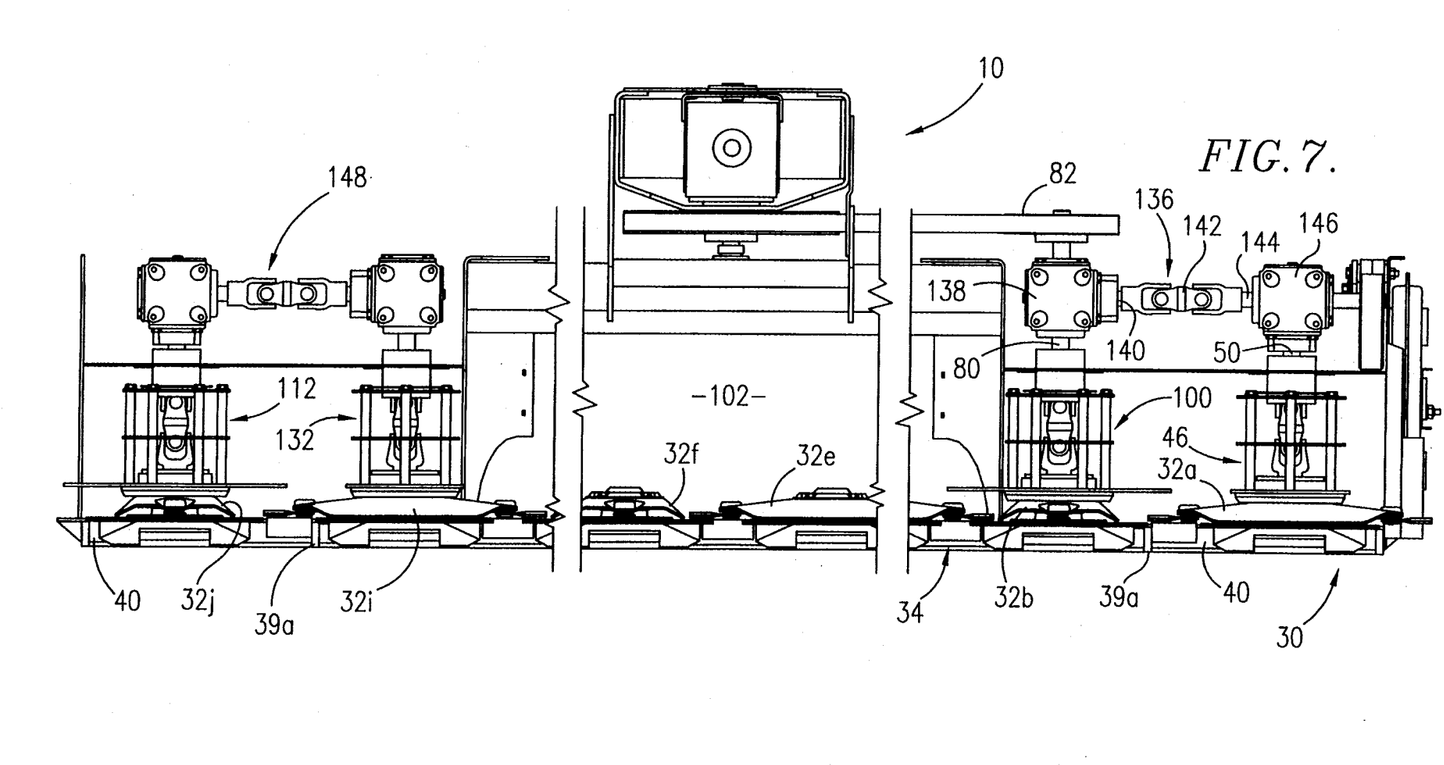
FIG. 7 is a fragmentary, front elevational view of the header showing an alternative over-the-top drive arrangement for the two outermost cutters of the cutter bed utilizing gearboxes and universal joints.

FIG. 7 illustrates the harvester 10 with a modified form of mechanism that transfers power from the cutter 32b to the cutter 32a, and from the cutter 32i to the cutter 32j. Thus, in FIG. 7 the mechanism 136 between the cutters 32a and 32b includes a first right angle gearbox 138, a horizontal output shaft 140 projecting from the gearbox 138 toward the cutter 32a, a universal joint coupling 142 at the end of shaft 140, an input shaft 144 at the end of coupling 142, and a second right angle gearbox 146. The shaft 50 for the cutter 32a leads downwardly out of the gearbox 146. Similarly, the shaft 80 for cutter 32b extends downwardly out of the gearbox 138, as well as upwardly to the large sheave 82.

The same type of change is made at the right end of the header in which the power transferring mechanism 148 supplies driving power from the cutter 32i to the cutter 32j. The operating components of the mechanism 148 are substantially identical to those of the mechanism 136, and thus will not be described.

Figure 8:
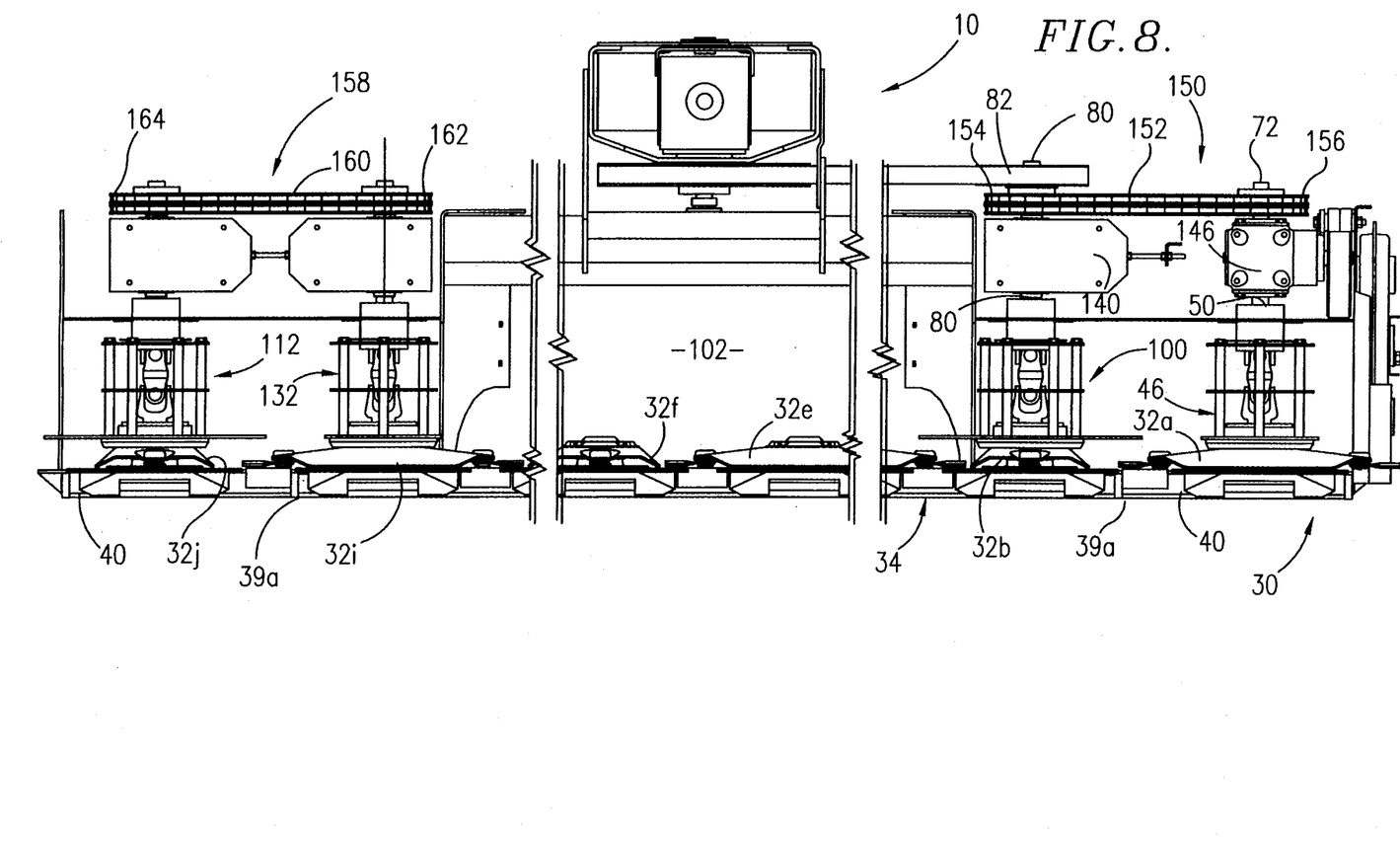
FIG. 8 is a similar fragmentary, front elevational view of the header illustrating another embodiment of over-the-top drive for the outer cutters utilizing a chain and sprocket mechanism.

FIG. 8 shows another embodiment for the mechanism which transfers power from the cutter 32b to the cutter 32a, and from the cutter 32i to the cutter 32j. In this arrangement the mechanism 150 between cutter 32a and cutter 32b most closely resembles the mechanism 83 of the first embodiment, with the exception that instead of a timing belt and timing sheaves, a chain 152 and sprockets 154, 156 are utilized. Similarly, in the mechanism 158 between the cutters 32i and 32j, a chain 160, sprocket 162 and sprocket 164 are used.

Figure 9:
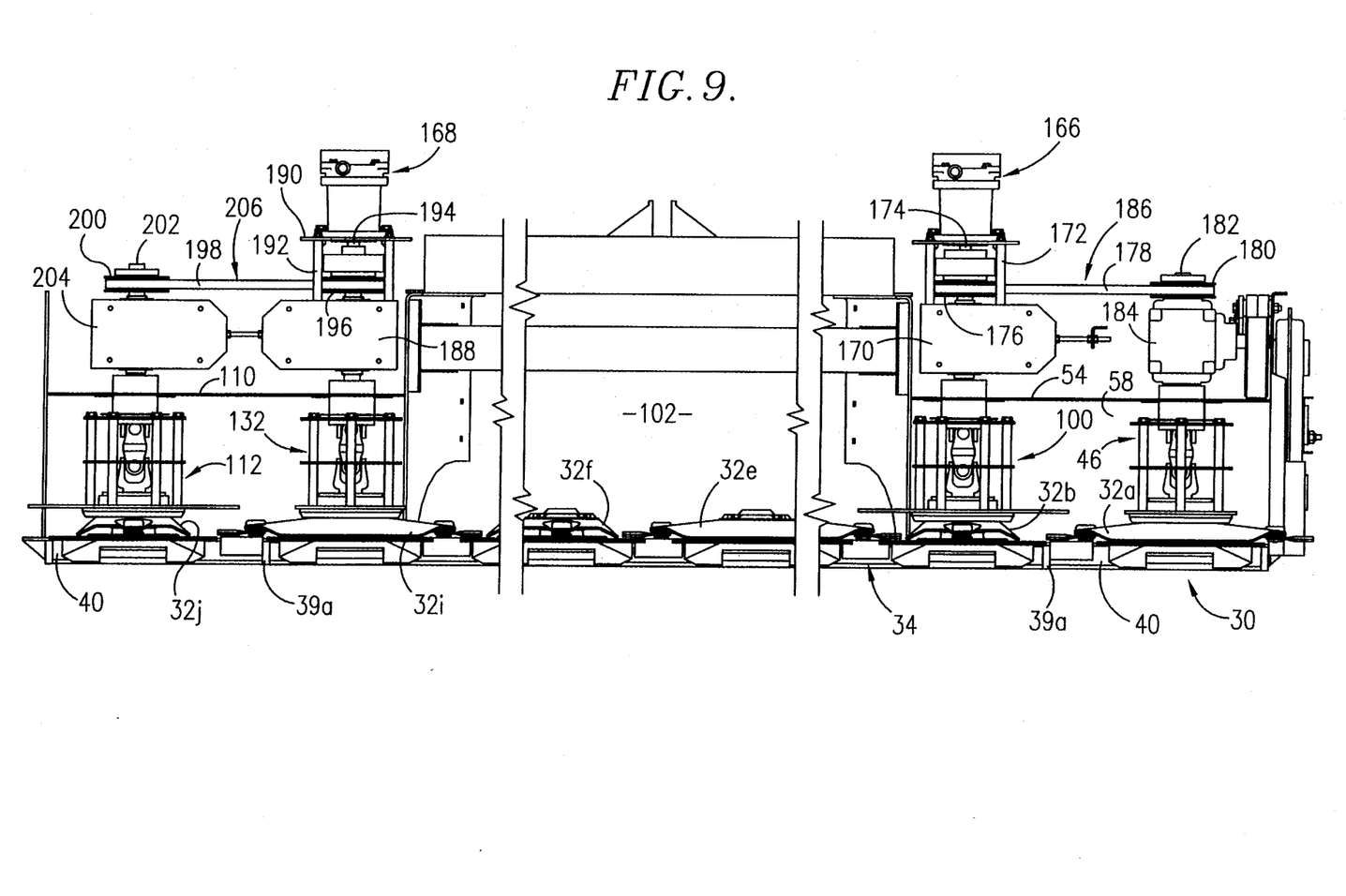
FIG. 9 is another fragmentary, front elevational view of the header showing an alternative embodiment employing a pair of hydraulic motors for the cutter bed.

FIG. 9 illustrates a hydraulic drive arrangement for the cutter bed 30. In lieu of the mechanical drive arrangement of FIGS. 1–8, a pair of rotary hydraulic motors 166 and 168 are utilized to drive the cutters 32a–32j. In the case of the motor 166, a C-shaped bracket 170 is secured to the upright front wall 62 of the header and carries an elevated platform 172 and struts 173 for motor 166 so that motor 166 is disposed high above the top wall 54 of the crop handling region 58. An upright shaft 174 projects downwardly from the motor 166 and carries a timing sheave 176 before passing on down to the cutter 32b in the usual way. The timing sheave 176 is entrained by a timing belt 178, which in turn entrains a timing sheave 180 on an upright shaft 182 associated with the cutter 32a. The shaft 182 projects into a right angle gearbox 184 which operably connects with the cutter 32a in the usual manner.

The cutters 32b–32i are drivingly interconnected with one another through the gear case 34 by spur gears in the same manner as disclosed with respect to FIGS. 1–8. Similarly, the endmost cutters 32a and 32j are carried on hollow support extensions 40 which are devoid of spur gears and other drive mechanism in the same manner as disclosed in FIGS. 1–8. Consequently, it will be seen that driving power for the cutter 32a is obtained exteriorly of the gear case 34 via mechanism broadly denoted by the numeral 186 and including the timing sheave 176, the timing belt 178 and the timing sheave 180. Hydraulic motor 166 thus provides driving power for both the cutter 32a and the cutter 32b.

At the opposite end of the machine, the hydraulic motor 168 is supported on its own C-shaped bracket 188 high above the top wall 110 of the header by a platform 190 and struts 192. An output shaft 194 from the hydraulic motor 168 carries a timing sheave 196 and passes on down through the bracket 188 for operable connection with the cutter 32i in the usual manner. A timing belt 198 is entrained around the timing sheave 196 and also a timing sheave 200 on the upper end of an upright shaft 202 associated with the cutter 32j. Shaft 202 passes downwardly through and is supported by a C-shaped bracket 204 attached to the front wall 62 of the header and connects with the cutter 32j at its lower end in the usual manner. Thus, it will be seen that the timing sheave 196, the timing belt 198 and the second timing sheave 200 comprise mechanism 206 for transferring driving power from the shaft 194 of cutter 32i to the shaft 202 of cutter 32j. The motor 168 thus drives both the cutter 32i and the cutter 32j.

Moreover, it will be seen that the two hydraulic motors 166, 168 cooperatively drive and share the load of all of the cutters 32a–32j associated with the cutter bed 30. Since the intermediate cutters 32b–32i are all interconnected via the gear train within the gear case 34, and the cutters 32a and 32j are connected to the input drive shafts 174 and 194 of the hydraulic motors 166, 168, all cutters of the cutter bed 30 simultaneously receive driving input power from the hydraulic motors 166 and 168. With the motors 166 and 168 connected in a parallel hydraulic fluid flow relationship, any additional loading experienced by one of the motors 166 or 168 is immediately shared by the other hydraulic motor, thus maintaining equal loads on the two motors. This also means, for example, that the spur gear associated with the cutter 32b does not need to bear all of the loading from the other spur gears in the gear case since approximately one half that loading is directed to the spur gear associated with the cutter 32i at the opposite end of the gear case 34. Consequently, bearings, gears and other components of the system will have significantly increased wear life.

Load Compensating Circuit

Figure 10:
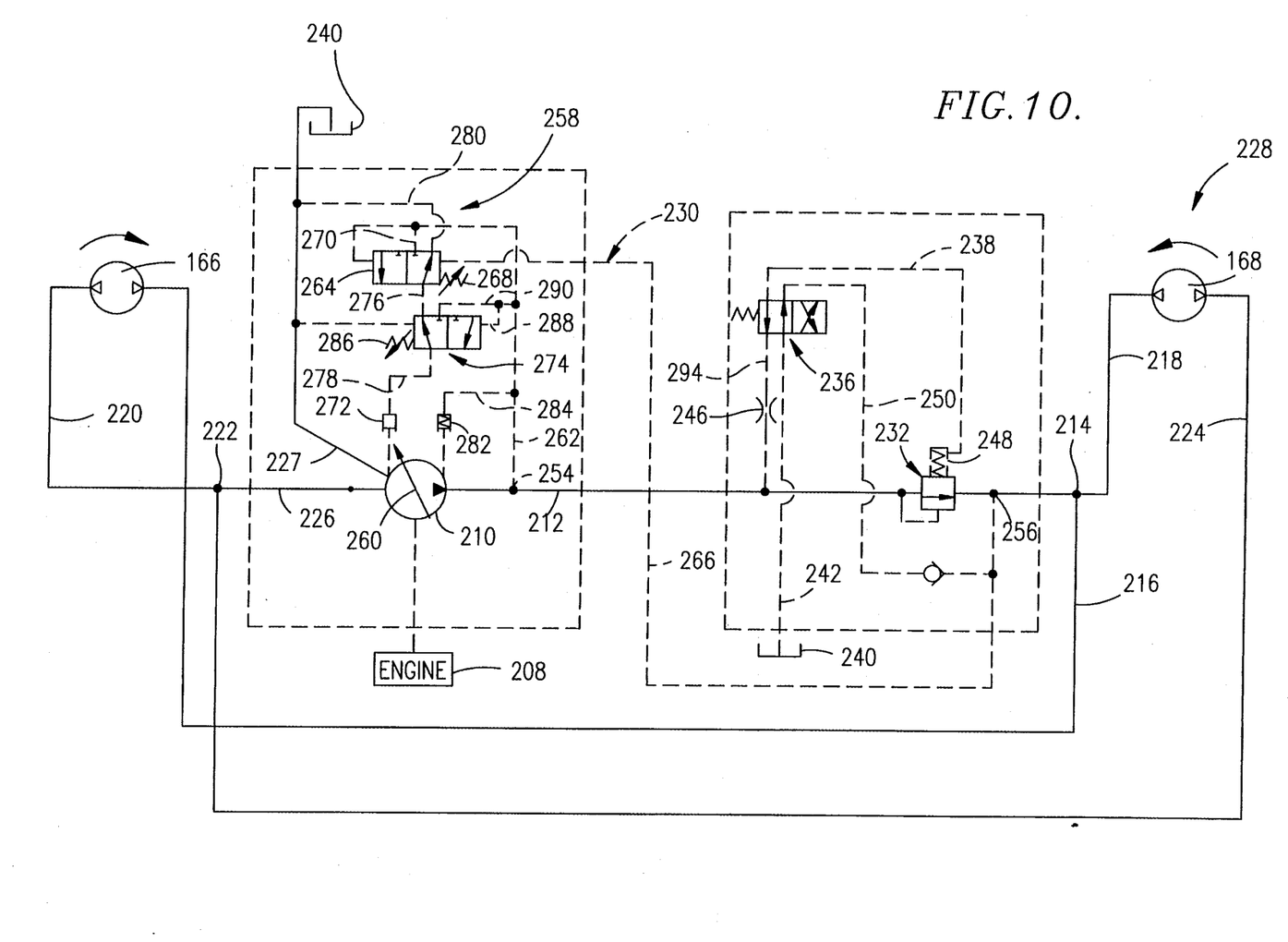
FIG. 10 is a schematic diagram of the hydraulic circuit for the hydraulic cutter bed drive of FIG. 9, including an engine speed, load compensating circuit.

FIG. 10 shows a hydraulic drive and control circuit which is especially suited for a self-propelled machine in which the tractor portion is provided with an engine 208 and an onboard pump 210 that is mechanically driven by the engine 208. The pump 210 is preferably a pressure-compensated, load-sensitive pump, a suitable one of which is available from Vickers, Inc. of Omaha, Nebr. A swash plate of the pump 210 may be adjustably stroked or destroked to change its angular position so as to correspondingly adjust the output flow rate of oil therefrom as measured, for example, in gallons per minute.

A high pressure line 212 leads from the pump 210 to a tee connection 214, where one branch line 216 leads to the motor 166 and another branch line 218 leads to the motor 168. A return line 220 leads from the motor 166 back to another tee connection 222, while a return line 224 leads from the motor 168 to the tee connection 222. From the connection 222 a single low pressure line 226 leads to the backside of the pump 210. A case drain line 227 leads from the backside of the pump 210 to the tank 240 to remove any oversupply of oil to the pump 210 and to provide cooling for the pump. In the preferred embodiment, the compensating pump 210 is provided with a fixed displacement, vanetype charge pump (not shown) of well known construction to supply oil to the pump 210. Broadly speaking, the lines and connections 212–226 comprise an operating circuit for the motors 166 and 168.

The operating circuit 228 is illustrated in solid lines in FIG. 10, while a control circuit for the operating circuit 228 is illustrated for purposes of clarity primarily in dashed lines and is denoted broadly by the numeral 230. One component of the control circuit 230 is a pilot operated, two-position poppet valve 232 which can either be open or closed. The poppet valve 232 is located in the line 212 upstream from the tee 214 and is normally closed as illustrated in FIG. 10. Two conditions must be met before it can be shifted to its open condition to allow flow there past to the motors 166 and 168. First, there must be pressure in the line 212 sufficient to shift the spring-loaded poppet via a pilot line 234. Second, an electrically operated control valve 236 must be energized and shifted out of its closed position of FIG. 10 to an open position leftward of that illustrated in FIG. 10 so as to communicate a return line 238 from the poppet valve 232 to tank 240 via a tank line 242. Normally, with the electrically operated valve 236 in its closed position of FIG. 10, the return line 238 communicates with a high pressure line 244 connected to the main high pressure line 212. An orifice 246 in high pressure line 244 reduces the pressure therein somewhat on the downstream side of the orifice 246 such that the resulting pressure within line 238 plus the resistance of a spring 248 of the poppet valve 232 keeps the poppet 232 normally closed. When the electric valve 236 is opened, the high pressure line 244 simply comes into communication with a line 250 having a check valve 252 that prevents further flow through the line 250. When the electric valve 236 is in its closed FIG. 10 position the line 250 communicates with tank 240 via the tank line 242 and the check valve 252 can open, but there is no operating pressure in the operating circuit 228 on the downstream side of the poppet valve 232 so there is no meaningful flow through the line 250 to the tank 240 at this time. It is contemplated that the electric valve 236 will be controlled from the cab of the tractor in an easily accessible position to the operator.

The poppet valve 232 is operable to serve as a restrictive orifice when in its open position. Thus, when poppet valve 232 is open and pressurized fluid is flowing through the line 212, there is a pressure drop as the fluid passes through the poppet valve 232. In other words, the pressure at a tee connection 254 on the upstream side of the poppet valve 232 is higher at such time than the pressure at a tee connection 256 on the downstream side of the poppet 232. This pressure differential, more specifically the magnitude thereof, is utilized to control an adjusting circuit 258, comprising a portion of the control circuit 230, for adjusting the volume output of the pump 210 whose swash plate may be denoted schematically for purposes of illustration by the arrow 260 associated with the pump 210.

The adjusting circuit portion 258 of the control circuit 230 includes a high pressure line 262 that joins with the high pressure line 212 at the tee connection 254 and leads to the left end of a pressure differential operated load compensating valve 264. On the other hand, the opposite, right end of the load compensating valve 264 viewing FIG. 10 communicates with the lower pressure tee connection 256 via a low pressure line 266. The load compensating valve 264 is biased toward its closed position of FIG. 10 by an adjustable spring 268 such that the compensating valve 264 only shifts rightwardly to its open position when the pressure differential between the tee intersections 254 and 256 is sufficiently high as to overcome the resistance of the spring 268. When in such open, rightwardly shifted position, the load compensating valve 264 communicates a short line 270 from the high pressure line 262 with a destroking piston 272 via a pressure limiting valve 274 and flow lines 276, 278 on opposite upstream and downstream sides of the limiting valve 274. The destroking piston 272 is operable to shift the swash plate 260 in a direction to reduce the volume output at such time. On the other hand, when the load compensating valve 264 is in its unactuated position of FIG. 10, the destroking piston 272 is communicated with the tank 240 via a drain line 280 leading from the valve 264 such that the destroking piston 272 receives no operating pressure at that time. Conversely, the stroking piston 282 of the pump 210 is communicated with the high pressure line 262 via flow line 284 at all times such that the stroking piston 282 continuously seeks to move and hold the swash plate 260 in its maximum flow position. Moreover, the stroking piston 282 has a spring associated therewith that biases the piston 282 toward a full stroke position even when there is no pressure in the high pressure line 212.

When the load compensating valve 264 is rightwardly shifted out of its position in FIG. 10 to an operated position so as to communicate the destroking piston 272 with the high pressure line 262 via short line 270, line 276 and line 278, both the destroking piston 272 and the stroking piston 282 simultaneously receive the same operating pressure from high pressure line 262. However, the surface area of the destroking piston 272 is larger than that of the stroking piston 282, causing the destroking piston 272 to dominate and force the swash plate back toward a neutral position in which no oil is pumped by the pump 210.

The limiting valve 274 is normally held in its closed position of FIG. 10 by the adjustable spring 286 at the left end of the valve viewing FIG. 10. Thus, the amount of pressure required to open the limiting valve 274 can be adjusted by varying the force of the spring 286. When in its closed position of FIG. 10, the limiting valve 274 simply communicates the flow line 278 of the destroking piston 272 with the reservoir 240 via lines 276 and 280, assuming the load compensating valve 264 is in its unactuated position of FIG. 10. When the fluid pressure within the main operating line 212 reaches the limit established by the limiting valve 274, the valve is caused to shift leftwardly from its FIG. 10 position by pressure in a short line 288 which is connected to the high pressure line 262 to bring pressure to bear against the right end of the valve 274. This will cause the destroking piston line 278 to be communicated with a flow line 290 leading to the valve 274 from the high pressure line 262 so as to admit high pressure oil to the destroking piston 272. Although both the destroking piston 272 and the stroking piston 282 will be exposed to the high pressure simultaneously, because of the greater surface area of the destroking piston 272, the destroking piston will immediately shift the swash plate 260 back to neutral to stop the pump from pumping oil.

When the engine 208 is first started and the pump 210 begins operation, the swash plate 260 becomes stroked to its maximum volume position since the stroking piston 282 is spring biased to its maximum stroke. Pressure begins to rise in the main operating line 212, but no oil can flow to the motors 166 and 168 at this time because the poppet valve 232 is closed. Consequently, inasmuch as there is essentially no oil pressure at the tee connection 214 at this time as long as the poppet valve 232 remains closed, the pressure differential seen by the loading valve 264 climbs to its operating level, at which time the loading valve 264 is caused to shift rightwardly from its FIG. 10 position to align the flow line 270 with the flow line 276. This operates the destroking piston 272 to return the swash plate 260 to its neutral position so that no additional oil is supplied by the pump 210 at this time.

When the operator is ready to start cutting, he operates a switch (not shown) in the tractor cab to energize the electric valve 236. This shifts the valve 236 leftwardly from its position in FIG. 10 to communicate the return line 238 with the tank line 242, which lowers the pressure within line 238 sufficiently that the pressure in pilot line 234 can shift the poppet valve 232 to its open position. Once the poppet valve 232 is open, the operating circuit 228 becomes fully pressurized and the motors 166 and 168 commence rotating.

As pressurized oil passes through the poppet valve 232, the valve 232 functions as a restrictive orifice, causing a pressure drop on the downstream side of the valve 232. Thus, the pressure at tee connection 254 is normally higher than the pressure at tee connection 256. The control circuit 230 takes advantage of this differential to communicate the higher pressure at tee connection 254 to the left end of load control valve 264 via line 262, and the lower pressure at tee connection 256 to the right end of the load control valve 264 via line 266. When this differential exceeds the preset limit, the load control valve 264 shifts rightwardly, communicating the destroking piston 272 with high pressure fluid via lines 262,270, 276 and 278. This destrokes the pump 210 to prevent the volume flow rate from exceeding a preset amount as determined by the adjustment of the control spring 268.

During cutting operations the harvester sometimes encounters heavy cutting conditions which put load on the operating circuit 228 and tend to lug down the engine 208. If this tendency to reduce the engine speed were not counteracted in some way, the pump 210 would slow down, the rate of flow of oil from the pump 210 would be reduced, and the cutting speed of the motors 166 and 168 would correspondingly decrease. Accordingly, the adjusting circuit 258 of the control circuit 230, in particularly the load compensating valve 264, is operable to responsively stroke the swash plate 260 when increased loading in the operating circuit 228 tends to lug down the engine 208, thus maintaining the cutting speed of the cutter bed 30 essentially constant at all times.

It will be seen in this respect that when the motors 166 and 168 become more difficult to rotate due to increased resistance at the cutter bed 30, such additional loading is immediately experienced in the high pressure operating line 212. This additional loading tends to make the engine 208 slow down so as to lower the volume flow rate from the pump 210. This volume decrease, however, results in a decrease in the pressure differential across the poppet valve 232 such that the compensating valve 264 stays in its leftmost position of FIG. 10 to cause the stroking piston 282 to shift the swash plate 260 in a direction to increase the volume flow rate of oil from the pump 210. The increased volume flow rate from the pump 210 compensates for the reduction in engine speed. Consequently, the cutters 32 remain turning at the desired cutting speed even when heavy conditions tend to lug down the engine 208. Once the heavy conditions are handled, the engine 208 speeds back up and tends to increase the volume rate of oil leaving the pump 210. However, any such volume increase merely increases the pressure on the upstream side of the poppet valve 232 so as to increase the pressure differential seen by the compensating valve 264. When such differential reaches the preset limit, the valve 264 shifts rightwardly viewing FIG. 10 to expose the destroking piston 272 to high pressure oil and thus shift the swash plate 260 in a direction to bring the rate of flow back down to its normal level. Of course, if the cutter becomes plugged, the limiting valve 274 will kick in and shut down the flow from the pump 210 to avoid damage to the system.

One suitable operating and control system, including the pump 210 with its destroking piston 272 and stroking piston 282, poppet valve 232, electric control valve 236, compensating valve 264 and limiting valve 274, is available from Vickers, Inc. of Omaha, Nebr. as system No. PVH98-MCD-V10R-02306232, assembly No. 02-306232. The poppet valve 232 and the electric control valve 236 may be obtained separately from the other valves of the system, combined within a valve block or unitary body, from Modular Controls Division of Vickers, Inc., Carrol Stream, Ill., as Part No. MCD-4326.

Non-Auger Conveying Means

FIGS. 11–18 relate to alternative arrangements for conveying the crop materials severed by cutters 32a and 32b as well as 32i and 32j inwardly toward the discharge opening 102. For the sake of space, only the left end of the header has been illustrated in connection with the alternative arrangements, but it will be understood that a similar construction is also utilized at the opposite end of the header. Furthermore, some of the embodiments utilize hydraulic drive and others utilize mechanical drive, and such two different power types are considered interchangeable insofar as the conveying principles disclosed by the alternative embodiments of FIGS. 11–18 are concerned.

Figure 11:
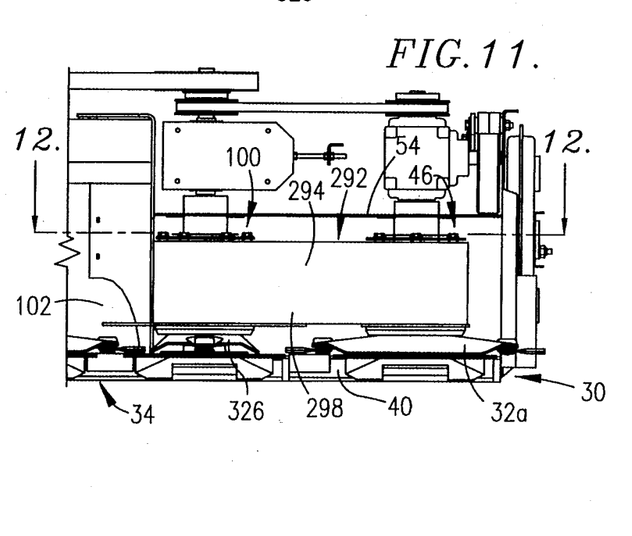
FIG. 11 is a fragmentary, front elevational view of the left end of the header illustrating one form of conveying means for directing crop severed by the outboard cutters toward the central discharge opening.
Figure 12:
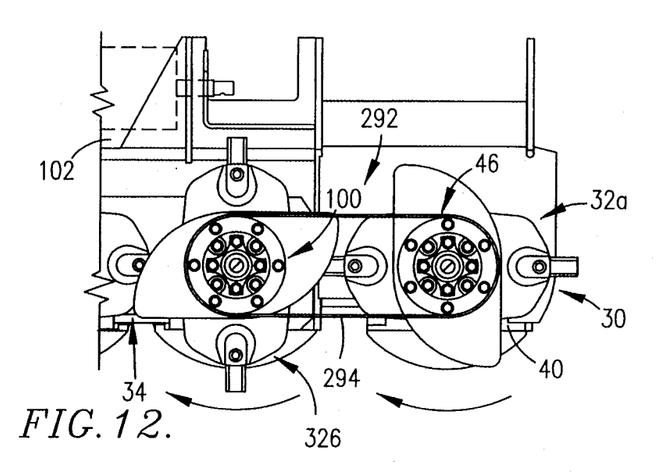
FIG. 12 is a horizontal cross sectional view thereof taken substantially along line 12—12 of FIG. 11.

FIGS. 11 and 12 show a conveying means 292 in the form of a wide, upright, flat endless belt 294 that is entrained around the impeller cages 46 and 100. Because the impeller cages 46 and 100 are driven in clockwise directions viewing FIG. 12, the forwardly facing front surface of the conveyor belt 294 moves from right to left, or inwardly toward the discharge opening 102.

It will also be noted that the front surface of the belt 294 is spaced rearwardly from the forwardmost extremity of the cutters 32. Thus, there is presented a certain accumulation space between the forward extremities of the cutters and the vertical face of the belt 294 within which the crop material can flow as it is severed and directed laterally inwardly.

Figure 13:
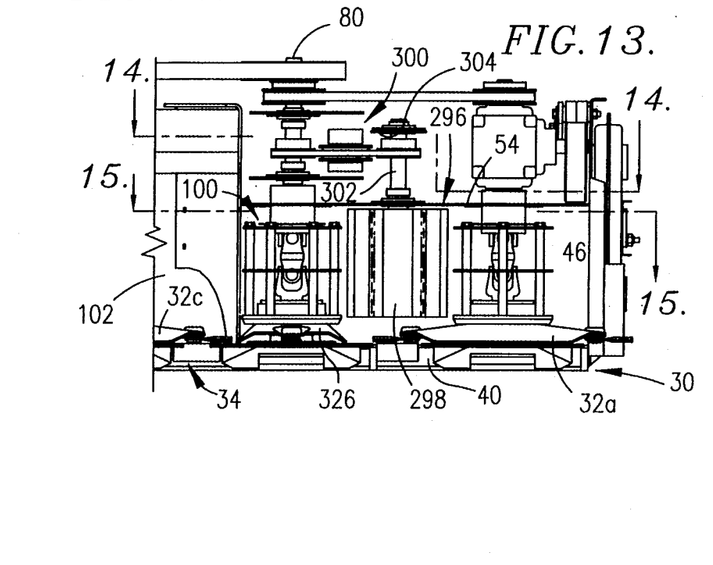
FIG. 13 is a fragmentary, front elevation view of the left end of the header illustrating a second form of conveying means for the outboard cutters utilizing a rotary drum between the impeller cages of two outermost cutters.
Figure 14:
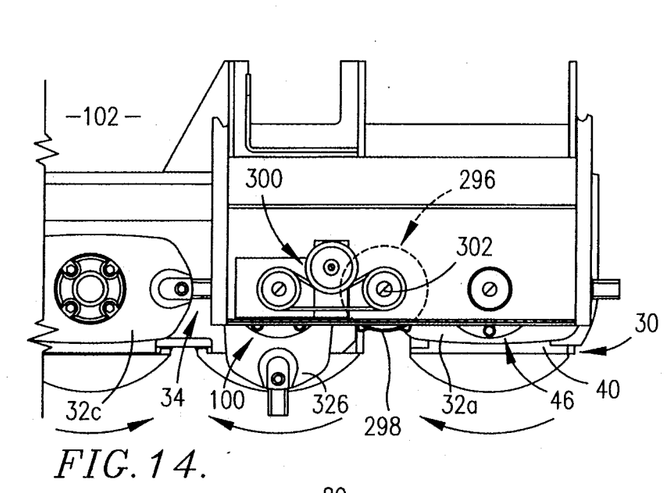
FIG. 14 is a generally horizontal cross sectional view thereof taken generally along line 14—14 of FIG. 13.
Figures 15, 16, 17, 18:
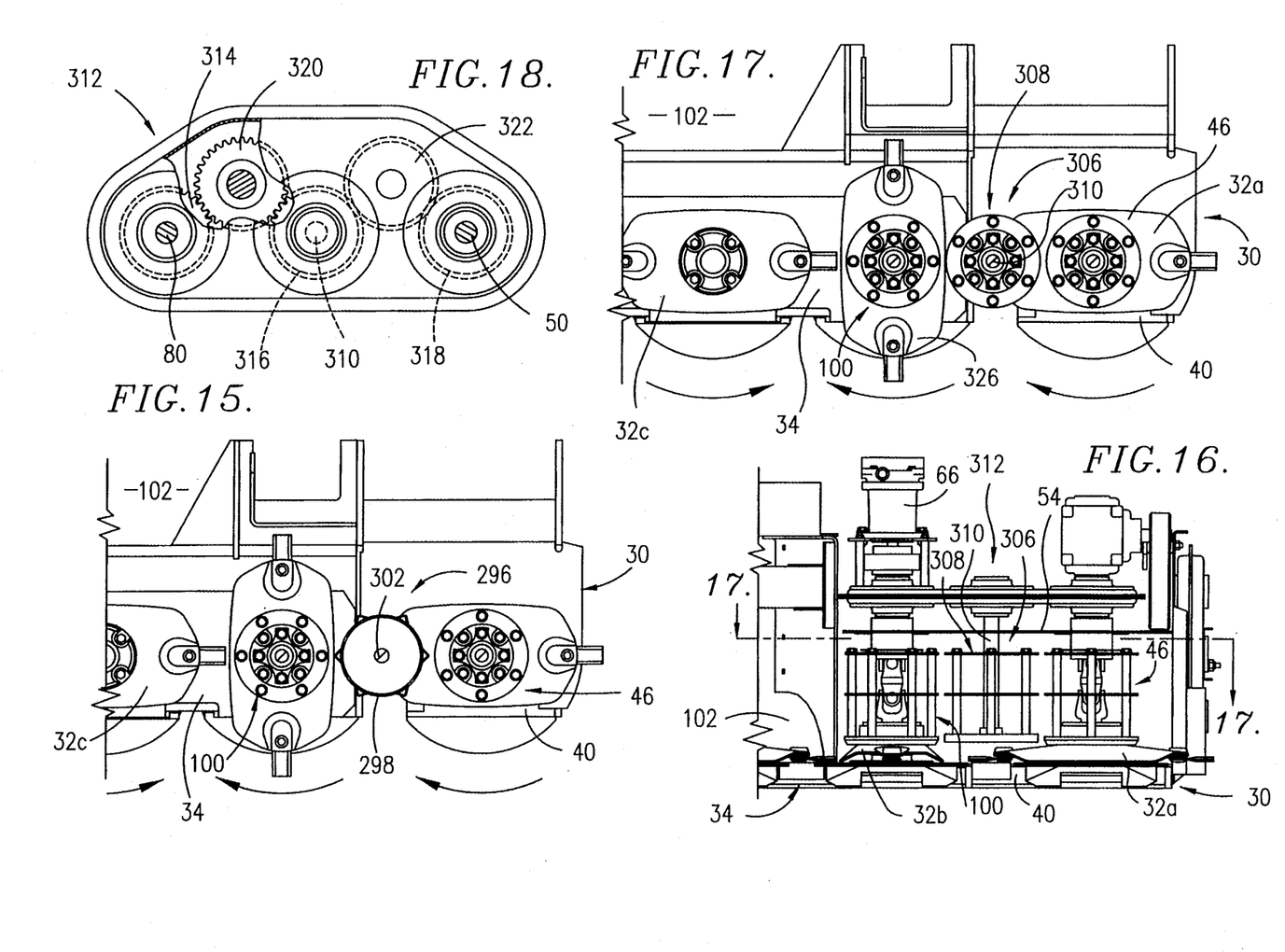
FIG. 15 is another horizontal cross sectional view thereof taken substantially along line 15—15 of FIG. 13.
FIG. 16 is a front elevational view of the left end of the header showing another form of conveying means for the outboard cutters, including an impeller cage located between the impeller cages of the two outermost cutters.
FIG. 17 is a horizontal cross sectional view thereof taken substantially along line 17—17 of FIG. 16.
FIG. 18 is a top plan view of the spur gear drive arrangement utilized for the cage type conveyor construction of FIG. 16 (and for outer cutters without an intermediate conveyor cage if desired), with portions of the housing for the spur gear drive being broken away to reveal details of construction.

FIGS. 13, 14 and 15 show an alternative conveying means 296 comprising an upright, rotary drum 298 and the impeller cages 100 and 46. The drum 298 is located between the impeller cages 46 and 100 with its front periphery in line with the corresponding front peripheries of the cages 46 and 100, thus effectively presenting a forwardly facing crop conveying surface somewhat similar to the front conveying surface of the belt 294 in FIGS. 11 and 12. An overhead belt and pulley drive 300 for the drum 298 receives driving power from the shaft 80 associated with the cutter 32b so as to rotate in a clockwise direction viewing FIG. 14, like the impeller cages 46 and 100. The drum 298 is suspended from the top wall 54 of the header by an upright shaft 302 of the drive and by a suitable bracket (only fragmentarily shown) 304 secured to the upright front wall 62 of the header. It will be noted in FIG. 13 that the bottom of the drum 298 is spaced above the upper surface of the gear case 34 such that there is no support or drive structure directly beneath the drum 298. Moreover, it will be noted that the periphery of the drum 298 is vertically ribbed to enhance its crop conveying capabilities.

The conveyor means 306 in FIGS. 16, 17 and 18 comprises a third impeller cage 308 in combination with the other two impeller cages 46 and 100. As with the drum 298 of FIGS. 13–15, the cage 308 is located between the other cages 46 and 100 and has its forward extremity in line with the corresponding forward extremities of the other cages. Thus, all three of the cages 46, 308 and 100 cooperatively present an effective front conveying surface that is set back from the forward most cutting circles of the cutters 32a and 32b to provide space in which the crop can flow laterally inwardly. The cage 308 is driven in a clockwise direction viewing FIG. 17, corresponding to the direction of rotation of the cutters 32a and 32b.

The cage 308 is constructed in an identical manner to the cages 46 and 100 and therefore will not be explained in detail. Unlike the cages 46 and 100, however, the cage 308 is suspended in place with an absence of drive structure or cutter structure beneath the bottom thereof and the top of the gear case 34. An upright drive shaft 310 extends upwardly through the center of the cage 308, through the top wall 54, and into a flat horizontal gear case 312. Within the gear case 312, a gear train is contained for transferring power between the shaft 80 of cutter 32b, the shaft 310 of the cage 308 and the shaft 50 of the cutter 32a. Such gear train includes a spur gear 314 on the shaft 80, a spur gear 316 on the shaft 310, a spur gear 318 on the shaft 50, an idler gear 320 rotatably supported in meshing engagement with the spur gears 314 and 316, and a second idler gear 322 in meshing engagement with the spur gears 316 and 318. It will be seen that the gear case 312 can be as long as necessary to accommodate the length of gear train that is appropriate for the number of cutters and conveyor cages utilized outboard of the discharge opening 102. Thus, although the present invention has been illustrated with only two outboard cutters 32a and 32b, it will be appreciated that a greater number of outboard cutters may be utilized. A similar gear train and case could be used as one form of overhead power transmitting mechanism in lieu of the mechanisms 83 and 134, 136 and 148, 150 and 158, and 186, 206.

The power for driving the cutter bed 30 in the embodiment of FIGS. 16-18 is hydraulic power, one of the hydraulic motors 66 being illustrated as drivingly coupled with the shaft 80 of the cutter 32b. Mechanical power could be used instead.

Furthermore, although the embodiments of FIGS. 16-18 illustrate a single, relatively large diameter rotary member between the cages of the two outermost cutters, it will be appreciated that the single member could be replaced by two or more smaller diameter rotary members without departing from the principles of the present invention. If the smaller diameter members are utilized, it would be important to shift their axes of rotation far enough forwardly to assure that their forward extremities are generally transversely aligned with the front extremities of the cages 46 and 100, for example, so as to effectively provide a moving conveying surface.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a machine for mowing crop materials, the improvement comprising:
    a cutter bed including a series of rotary cutters extending across the path of travel of the machine and rotatable about individual upright axes;
    a crop discharge opening located behind the cutter bed for receiving severed crop materials from the series of cutters,
    said discharge opening having a pair of opposite ends,
    said series of cutters including a group of intermediate cutters positioned in front of said discharge opening with the first and last cutters of said intermediate group being located adjacent said opposite ends of the discharge opening,
    said series of cutters further including at least a pair of opposite end cutters located outboard of the first and last cutters of the intermediate group and outboard of said discharge opening;
    means for driving the cutters of said intermediate group in oppositely rotating pairs for directing severed material between the cutters of each pair and into the discharge opening,
    the first and last cutters of the intermediate group rotating generally inwardly toward the discharge opening across the front of the cutter bed;
    means for driving the end cutters in the same direction as their next adjacent first or last cutter of the intermediate group such that the end cutters and the first and last cutters of the intermediate group all rotate generally inwardly toward the discharge opening across the front of the cutter bed; and
    conveying means operably associated with each end cutter and its next adjacent intermediate group cutter for moving cut crop materials inwardly toward said discharge opening.

2. In a machine for mowing crop materials as claimed in claim 1,
    said conveying means including an endless conveyor belt entrained around the axes of rotation of the end cutter and its next adjacent intermediate group cutter,
    said conveyor belt having a generally upright, flat, front surface and being driven in a direction to move said front surface toward the discharge opening.

3. In a machine for mowing crop materials as claimed in claim 1,
    said conveying means including an upright generally cylindrical impeller projecting upwardly from each end cutter and its next adjacent intermediate group cutter,
    said conveying means further including an intermediate, upright, generally cylindrical impeller located between each end cutter and its next adjacent intermediate group cutter,
    said intermediate impeller being rotatable in the same direction as the corresponding end cutter and adjacent intermediate group cutter such that the impellets effectively present a forwardly facing, inwardly moving front surface for conveying cut crop materials toward the discharge opening.

4. In a machine for mowing crop materials as claimed in claim 3,
    said intermediate impeller comprising a drum having an at least substantially solid exterior wall.

5. In a machine for mowing crop materials as claimed in claim 3,
    said intermediate impeller comprising a cage having a series of upright members arranged in a circumferentially spaced pattern.

6. In a machine for mowing crop materials as claimed in claim 5,
    said cage being suspended above and in spaced relation to the cutter bed,
    said cage having a drive shaft therefor extending downwardly into the cage from above the cage.

* * * * *